March 2, 1965 P. F. GIOMETTI 3,171,283
OVERRUNNING CLUTCH
Filed Dec. 4, 1962 2 Sheets-Sheet 1

INVENTOR.
Paul F. Giometti
BY
John Phillip Ryan
ATTORNEY

WITNESS:
Esther M. Stockton

March 2, 1965    P. F. GIOMETTI    3,171,283
OVERRUNNING CLUTCH
Filed Dec. 4, 1962    2 Sheets-Sheet 2

WITNESS:
Esther M. Stockton

INVENTOR.
Paul F. Giometti
BY
John Phillip Ryan
ATTORNEY

United States Patent Office 3,171,283
Patented Mar. 2, 1965

3,171,283
OVERRUNNING CLUTCH
Paul F. Giometti, Elmira, N.Y., assignor to The Bendix Corporation, Elmira Heights, N.Y., a corporation of Delaware
Filed Dec. 4, 1962, Ser. No. 242,144
8 Claims. (Cl. 74—6)

The present invention relates to a dentil type overrunning clutch and more particularly to a clutch wherein one of the dentil members is centrifugally actuated.

Dentil type overrunning clutches are useful in applications where the driven element of the clutch during some phase of operation will be propelled at a speed greater than the speed of the driving element of the clutch. When this situation occurs the clutch dentil teeth will overrun thereby gaining for the clutch the befitting name of "rattle clutch." One particular application for this type clutch is in starter drive gearing. The clutch driving and driven elements couple a prime mover to an element of the engine to be started, either by directly connecting the starter motor to the engine crankshaft or by connecting the starter motor to a pinion gear which, in turn, meshes with a gear of the engine to be started. When cranking the engine by either arrangement it is desirable to transmit sufficient starting torque without slippage. In the case where a starter gearing is utilized, the pinion will mesh with the engine gear during cranking but if the engine backfires, or when the engine becomes operative, the pinion will rotate at a greater speed than the speed of the prime mover and the pinion will drive the driven clutch element at a speed greater than the speed of the driving clutch element. Where a direct cranking arrangement is utilized, when the engine backfires or when a true start has been accomplished, the driven clutch member itself will rotate at a speed greater than the speed of the prime mover. It is desirable, therefore, that the prime mover not be driven by the engine and, consequently, the clutch dentil teeth are adapted to transmit torque only when the driving clutch element rotates at the same or a greater speed than the driven clutch element If fthe driven clutch element rotates faster than the driving clutch element, the dentil teeth will cam themselves apart and overrun. Should the period of overrun be more than momentary, it is then desirable that the dentil teeth be completely separated to prevent undue wear on the teeth and reduce clutch noise.

The prior art teaches the use of dentil overrunning clutches and also teaches the use of various means including separately operable centrifugally actuated weights to separate the clutch elements during overrunning. I propose, however, to provide a clutch having a centrifugally actuated clutch element for either its driving or driven elements.

It is an object of the present invention to provide a dentil overrunning clutch which is simple, efficient, dependable, and economical to manufacture and fabricate.

It is another object of the present invention to provide a novel centrifugally actuated dentil overrunning clutch which overruns freely and quietly.

It is still another object of the present invention to provide a dentil overrunning clutch incorporating centrifugal means integrally formed as part of one of the clutch elements for completely disconnecting the clutch elements during predetermined periods of overrun.

Further objects and advantages will be apparent from the following description taken in connection with the accompanying drawing, in which.

Figure 1:
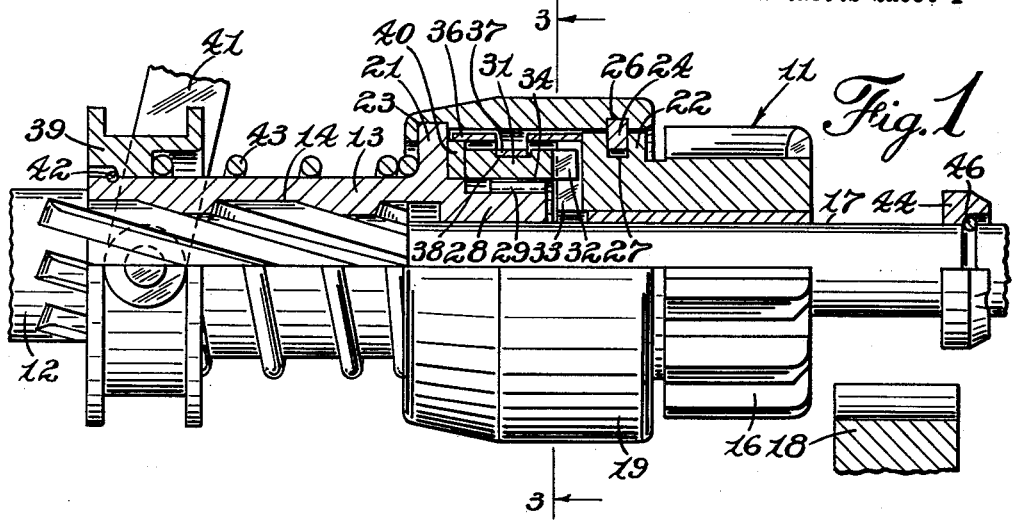
FIGURE 1 is a side elevational view, partly broken away and in section, of a starter drive incorporating a preferred embodiment of the invention, the overrunning clutch elements being illustrated in driving engagement.
Figure 2:
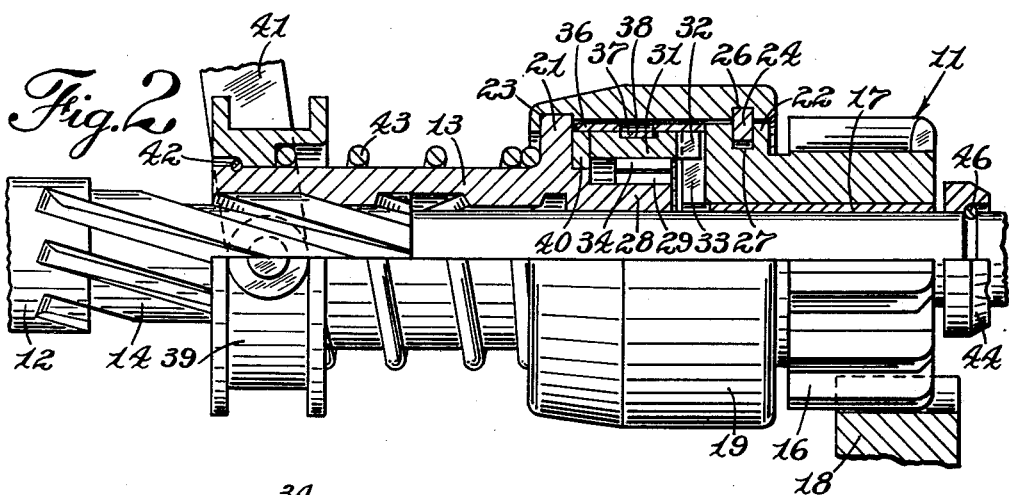
FIGURE 2 is a side elevational view, partly broken away and in section, illustrating the starter drive of FIGURE 1 in a driving position and further illustrating the clutch elements of the present invention in an overrunning condition.
Figure 3:
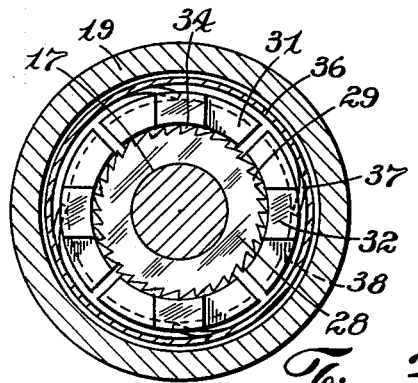
FIGURE 3 is a cross-sectional view taken substantially on the plane of line 3—3 of FIGURE 1.

In FIGURE 1 there is illustrated a starter drive generally designated 11 mounted on a shaft 12 which may be the extended shaft of a starting motor or prime mover (not shown). The driving transmission member of the drive is a sleeve 13 slidably mounted on the shaft 12 and connected for rotation therewith by means of interfitting helical splines 14. The pinion 16 is slidably journalled on the reduced diameter 17 of the shaft 12 for movement into and out of mesh with a gear 18 of the engine to be started. The housing 19 is supported on the radial flanges 21 and 22 formed on the sleeve 13 and pinion 16, respectively. The housing is secured to the sleeve flange 21 by being recessed and peened over as at 23. Relative axial movement between the housing and the pinion is prevented by the lock ring 24 interengaging the annular recesses 26 and 27 formed in the inner surface of the housing and the exterior peripheral surface of the flange 22. The housing surrounds and encloses the hereinafter described dentiled overrunning clutch which drivingly connects the sleeve to the pinion. The housing, therefore, defines and limits the spatial separation between the sleeve and the pinion.

Figure 4:
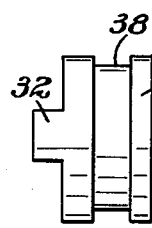
FIGURE 4 is a fragmentary detail view of one of the centrifugally actuated clutch elements.

The sleeve 13 is provided with a hub or annlus 28 slidably journalled on the reduced diameter portion 17 of the shaft 12. The external circumferential surface of the annulus has a plurality of radially outwardly extending dentil teeth 29 formed thereon to provide the driving clutch element. A weight member 31 (best illustrated in FIGURE 4) has an axially extending tongue 32 slidably engaging in a radial spline 33 formed on the radial face of the pinion flange 22 to provide a splined driving connection between the weight member and the pinion. Preferably a plurality of splined weight members are used to provide the clutch driving connection. The internal circumferential surface of the weight member has a plurality of radially inwardly extending dentil teeth 34 formed therein. The teeth 29 and 34 are complementary being adapted to provide driving engagement when the sleeve rotates at a speed equal to or greater than the pinion speed and further adapted to be cammed apart to overrun when the pinion speed exceeds that of the sleeve. A retaining spring 36 secured to the flange 22 has a plurality of inwardly directed arms 37 slidably engaging the groove 38 formed in the peripheral surface of each weight element. The spring urges the weight elements toward the annular clutch element to maintain the driving and driven clutch elements in a normally engaged condition. A thrust washer 40 is provided to limit axial movement of the weight members within the housing defined by the flanges 21 and 22 and housing 19.

Means for moving the pinion into and out of mesh comprises a shift collar 39 slidably mounted on the sleeve 13 and arranged to be actuated by a fork member 41. Collar 39 is confined between a thrust washer 42 and a mesh enforcing spring 43. Movement of the pinion in the meshing direction is limited by an abutment member 44 and a lock ring 46 secured to the free extremity 17 of the shaft 12.

In operation, when the starter drive is engaged by means of the shift collar 39 and fork member 41, the pinion 16 will mesh with the engine gear 18. Engine cranking torque is transmitted from the starting motor shaft 12 to the driving transmisison sleeve member 13 by reason of the splined connection 14. The dentiled weight members 31 normally are urged into engagement with the dentiled annualr clutch member 28 by the retaining spring 36 to form a clutch connection which, in turn, has a splined connection 32, 33 to the pinion. Hence starting torque is effectively transferred from the sleeve 13 through the clutch connection to the pinion and thence to the engine to be started. During engine cranking, when the cranking speed equals or exceeds the pinion speed, the dentiled weight members 31 will be maintained in engagement with the annular clutch member 28 to form a torque transmitting connection.

When the engine becomes operative or if the engine should backfire, the pinion will be driven by the engine at a speed greater than that of the starting motor. The pinion will then drive the weight members 31 and the dentiled teeth 29, 34 will be caused to cam apart and overrun in a normal manner. The weight members during overrun will be subjected to centrifugal force. Limited overrunning, as would occur during a backfire or a false start, generally is not of sufficient duration to create sufficient centrifugal force to overcome the biasing force of the retaining spring 36 and, therefore, the clutch elements merely overrun. One the relative speed difference again favors the driving clutch elements overrunning ceases and torque is again effectively transmitted to the pinion gear. Extended overrunning, as would accompany a true engine start, will create appreciable centrifugal force on the weight members of the radially displaceable clutch member. This centrifugal force is, of course, due to the high rotative speed of the pinion. The centrifugal force on the weight elements which comprise segmental elements of the displaceable clutch member overcomes the force of the retaining spring 36 and allows the weight members to be radially displaced from the annular clutch member 28 thereby eliminating frictional contact between the dentil teeth 29 and 34. The elimination of frictional contact between the dentil teeth not only insures longer clutch life but also provides a quiet and smooth overrunning clutch operation.

When the drive is disengaged the pinion 16 is withdrawn from mesh with the engine gear 18. As the pinion speed decreases the retainer spring 36 will reassert itself and urge the weight members 31 back into their original position to reengage the dentil teeth 29 and 34 and ready the drive for another starting cycle.

Figure 5:
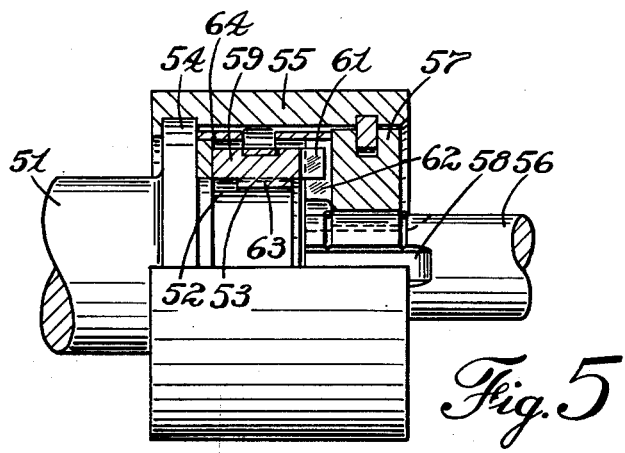
FIGURE 5 is a side elevational view, partly broken away and in section, illustrating one form of a direct cranking starter drive embodying the invention.

A direct cranking type of starter drive embodying the invention is illustrated in FIGURE 5. A power shaft 51 of a prime mover is provided with a fixed hub or annulus 52. The external circumferential surface of the annulus has a plurality of radially outwardly extending dentil teeth 53 formed thereon to provide a driving clutch element. A radial flange 54 is formed on the shaft 51 adjacent the driving clutch element. A driven shaft member 56, which may be the crankshaft of the engine but is not necessaryily so limited, is in axial alignment with the power shaft 51 and supports a flange member 57 thereon by means of straight axial splines 58. A housing sleeve 55 is fixedly secured to the flange 54 and is rotatably journalled on the flange 57. The housing sleeve and flanges combine to define a spatial separation encompassing the overrunning clutch of the invention.

A weight member 59 has a tongue 61 slidably engaging in a radial spline 62 formed in the flange 57. As in the previously described embodiment, a plurality of weight members 59 are used to provide the clutch driven element. The internal surface of each weight member is provided with radially inwardly extending dentil teeth 63. The dentil teeth 53, 63 are complementary and operate in a fashion identical to that of the embodiment above described. A retaining spring 64, identical to the retaining spring 36, is utilized to bias the weight members into engagement with the driving clutch 52 and to oppose the centrifugal force generated when the engine driven shaft 56 attains a speed greater than the speed of the power shaft 51. Clutch operation in the direct drive starter gearing is identical to that of the first described clutch embodiment.

It will be understood that other changes may be made in the design and arrangement of parts without departing from the spirit of the invention.

I claim:
1. In an internal combustion engine starter drive including a power shaft, a sleeve having a splined connection to the power shaft and having a radial flange adjacent one extremity, a pinion gear slidably and rotatably supported on the shaft adapted for movement into and out of mesh with a gear of the engine to be started and having a radial flange on the extremity of the pinion adjacent the sleeve extremity, an overrunning clutch connection between the sleeve and pinion, said clutch comprising, in combination:
   an annular clutch element fixedly secured to said one extremity of the sleeve, said annular clutch element having radially outwardly extending dentils formed on the external circumferential surface;
   radial spline means on the pinion flange, said splines opening toward the sleeve flange;
   a radially displaceable clutch element including a plurality of segmental elements, each of said segmental elements having means adapted to slidably engage in the radial spline means, said displaceable clutch element having radially inwardly extending dentils formed thereon adapted to engage said annular dentils, said annular and displaceable clutch element being adapted to provide a driving connection when the power shaft is rotating at speeds equal to and greater than the speed of the pinion and to provide an overrunning connection when the pinion is driven by the engine at a speed greater than the speed of the power shaft;
   means integral with and operatively connected to the displaceable clutch segmental elements responsive to the centrifugal force created when the pinion speed exceeds a predetermined speed for causing radial displacement of said segmental elements;
   spring means supported on one of said flanges having a like plurality of depending fingers frictionally bearing on the peripheral surfaces of said displaceable clutch element for normally maintaining the clutch elements engaged and for yieldably opposing the centrifugal force exerted by the means for radially displacing said segmental elements; and,
   means supported on said flanges providing a clutch housing, said clutch housing permitting relative rotation to occur between the sleeve and the pinion, said clutch housing further defining and limiting the axial separation between the sleeve and the pinion.

2. In a direct cranking starter drive for internal combustion engines including a power shaft of a prime mover, a driven shaft of the engine to be started, an overrunning clutch connection between the power and driven shafts, said clutch comprising, in combination:
   an annular clutch element fixedly secured to the power shaft, said annular clutch element having radially outwardly extending dentils formed on the external circumferential surface;
   a radially displaceable clutch element non-rotatably secured to the engine driven shaft, said displaceable clutch element having radially inwardly extending dentils formed thereon adapted to engage said annular clutch element dentils, said clutch element adapted to provide a driving connection when the power shaft is rotating at speeds equal to and greater than the speed of the engine driven shaft and to provide an overrunning connection when the driven engine shaft is rotating at a speed greater than the speed of the power shaft; and, means integral with and operatively connected to the displaceable clutch element responsive to centrifugal force created when the driven engine shaft exceeds a predetermined speed for completely disengaging the clutch elements.

3. A direct cranking starter drive clutch of the type set forth in claim 2 in which:

the driven engine shaft includes a flange member, said flange member being provided with a plurality of radial splines;

said displaceable clutch element further comprises a like plurality of segmental elements, each of said segmental elements having depending means adapted to slidably engage in one of the flange splines, said segmental elements being positioned circumferentially about said annular clutch element; and, resiliently yieldable means supported by one of said shafts to operatively engage the segmental clutch elements for normally urging the displaceable clutch segmental elements into driving engagement with said annular clutch.

4. A direct cranking starter drive clutch of the type set forth in claim 2 in which:

the power shaft includes a radial flange member;

the driven engine shaft includes a radial flange member, said flanges defining an axial spatial separation, said driven engine shaft flange member being provided with a plurality of radial splines opening into the spatial separation;

a sleeve member traverses the spatial separation and is fixedly secured to one of said flanges and rotatably journalled on the other of said flanges to provide a clutch housing for the clutch elements;

said displaceable clutch element further comprises a like plurality of segmental elements, each of said segmental elements having an axially extending tongue member adapted to slidably engage in one of the driven engine shaft flange splines and positioned circumferentially about said annular clutch element; and spring means are supported on one of said flanges within the clutch housing, said spring means having a like plurality of depending fingers for frictionally bearing on the peripheral portions of the displaceable clutch segmental elements for normally maintaining the clutch elements engaged and for yieldably opposing the centrifugal force exerted by the means for disengaging the displaceable clutch elements.

5. A clutch for joining a driving member to a driven member comprising:

a first clutch element fixedly secured to one of said members, said first clutch element having radially-outwardly-extending dentils formed on its circumferential surface;

a second clutch element non-rotatably secured to but radially displaceable relative to the other of said members, said second clutch element having radially-inwardly-extending dentils formed thereon adapted to engage said first clutch element dentils for providing a driving connection when said one member is rotating at speeds equal to and greater than the speed of said other member and for providing an overrunning connection when said other member is rotating at a speed greater than the speed of said one member;

said second clutch element comprises a plurality of segmental elements, each of said segmental elements being adapted for radial movement in response to centrifugal force created when said other member exceeds a predetermined speed for completely disengaging said clutch elements, said segmental elements being positioned circumferentially about said first clutch element; and resiliently yieldable means comprising an annular spring member supported by said other member, said spring member having a plurality of radially depending fingers frictionably bearing on the peripheral portions of said segmental elements for maintaining said clutch elements normally engaged with said first clutch element and yieldably opposing the centrifugal force exerted by the plurality of segmental elements.

6. A clutch of the type set forth in claim 5 in which:

said other member includes a flange member, said flange member being provided with a plurality of radially-extending splines; and said plurality of segmental elements each having an axially extending tongue member adapted to slidably engage in one of the flange splines.

7. A clutch for joining a driving member to a driven member comprising:

an annular clutch element fixedly secured to the driving member, said annular clutch element having radially-outwardly-extending dentils formed on the external circumferential surface;

a plurality of radially displaceable clutch elements non-rotatably secured to the driven member, said displaceable clutch elements having radially-inwardly-extending dentils formed thereon adapted to engage said annular clutch element dentils, said clutch elements adapted to provide a driving connection when the driving member is rotating at speeds equal to and greater than the speed of the driven member and to provide an overrunning connection when the driven member is rotating at a speed greater than the speed of the driving member;

said driving member including a first radial flange member;

said driven member including a second radial flange member, said first and second flanges defining an axial spatial separation, said second flange member being provided with a plurality of radial splines opening into the spatial separation;

a sleeve member traverses the spatial separation and is fixedly secured to one of said flanges and rotatably journalled on the other of said flanges to provide a clutch housing for the clutch elements;

said plurality of radially displaceable clutch elements each having an axially extending tongue member adapted to slidably engage in one of the driven member flange splines and positioned circumferentially about said annular clutch elements, said clutch elements responsive to centrifugal force created when the driven member exceeds a predetermined speed for completely disengaging the clutch elements; and spring means supported on said first flange member within the clutch housing, said spring means having a like plurality of depending fingers for frictionally bearing on the peripheral portions of the displaceable clutch elements for normally maintaining the clutch elements engaged and for yieldably opposing the centrifugal force exerted by said clutch elements.

8. A clutch for joining a driving member to a driven member comprising:

an annular clutch element fixedly secured to the driving member, said annular clutch element having radially-outwardly-extending dentils formed on the external circumferential surface;

a plurality of radially-displaceable clutch elements non-rotatably secured to the driven member, said displaceable clutch elements having radially-inwardly-extending dentils formed thereon adapted to engage said annular clutch element dentils, said clutch elements adapted to provide a driving connection when the driving member is rotating at speeds equal to and greater than the speed of the driven member and to provide an overrunning connection when the driven member is rotating at a speed greater than the speed of the driving member;

the driven member includes a flange member, said flange member being provided with a plurality of radial splines;

said plurality of radially-displaceable clutch elements each having depending means adapted to slidably engage in one of the flange splines, said radially displaceable elements being positioned circumferentially about said annular clutch element and responsive to centrifugal force created when the driven member exceeds a predetermined speed for completely disengaging the clutch elements; and resiliently-yieldable means supported by one of said members to operatively engage the disengageable clutch elements for normally urging the disengageable clutch elements into driving engagement with said annular clutch element.

References Cited by the Examiner
UNITED STATES PATENTS

| | | | |
|---|---|---|---|
| 1,846,766 | 2/32 | Starkey et al. | 74—6 |
| 2,640,359 | 6/53 | Gilbert et al. | 74—7 |
| 2,776,571 | 1/57 | Simone | 74—7 |
| 2,909,932 | 10/59 | Smith | 74—6 |

BROUGHTON G. DURHAM, *Primary Examiner.*